United States Patent
Ha et al.

(10) Patent No.: US 9,784,907 B2
(45) Date of Patent: Oct. 10, 2017

(54) DISPLAY DEVICE

(71) Applicant: Samsung Display Co., Ltd., Yongin-si, Gyeonggi-Do (KR)

(72) Inventors: Seung Hwa Ha, Namyangju-si (KR); Myoung Seok Son, Yongin-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 21 days.

(21) Appl. No.: 14/608,419

(22) Filed: Jan. 29, 2015

(65) Prior Publication Data

US 2016/0018589 A1    Jan. 21, 2016

(30) Foreign Application Priority Data

Jul. 18, 2014    (KR) ........................ 10-2014-0090797

(51) Int. Cl.
  *F21V 7/04*    (2006.01)
  *F21V 8/00*    (2006.01)

(52) U.S. Cl.
  CPC ............ *G02B 6/0088* (2013.01); *G02B 6/005* (2013.01)

(58) Field of Classification Search
  CPC ... G02B 6/0088; G02B 6/0086; G02B 6/0093
  USPC ........................................................ 362/606
  See application file for complete search history.

(56) References Cited

U.S. PATENT DOCUMENTS

| | | | | |
|---|---|---|---|---|
| 7,969,526 | B2* | 6/2011 | Yang | G02F 1/133308 349/187 |
| 9,354,383 | B2* | 5/2016 | Park | G02B 6/0085 |
| 9,400,349 | B2* | 7/2016 | Franklin | G02B 6/0093 |
| 9,423,661 | B2* | 8/2016 | Jeon | G02F 1/133308 |
| 9,429,793 | B2* | 8/2016 | Chen | G02F 1/133608 |
| 9,454,038 | B2* | 9/2016 | Jeon | G02F 1/133608 |
| 2007/0236910 | A1* | 10/2007 | Yun | G02F 1/133308 362/23.18 |
| 2011/0069255 | A1* | 3/2011 | Choi | G02B 6/0088 349/63 |
| 2012/0002437 | A1* | 1/2012 | Yabe | G02B 6/0028 362/606 |
| 2012/0169958 | A1* | 7/2012 | Lee | G02F 1/133308 349/58 |
| 2013/0050820 | A1* | 2/2013 | Shin | G06F 1/1601 359/465 |
| 2013/0141651 | A1* | 6/2013 | Kuromizu | G02B 6/0088 348/739 |
| 2013/0258707 | A1* | 10/2013 | Iwasaki | G02B 6/0041 362/607 |

(Continued)

FOREIGN PATENT DOCUMENTS

| KR | 10-2008-0045471 | 5/2008 |
|---|---|---|
| KR | 10-2009-0100949 | 9/2009 |

(Continued)

*Primary Examiner* — Peggy Neils
*Assistant Examiner* — William N Harris
(74) *Attorney, Agent, or Firm* — Robert E. Bushnell, Esq.

(57) ABSTRACT

A display device that may include a bottom chassis including a base portion and one or more side portions extending at a predetermined angle from the base portion, a light guide plate on an upper surface of the bottom chassis, an optical sheet on the light guide plate, and a display panel on the optical sheet. At least one of the side portions may have a different width from the other side portions.

16 Claims, 8 Drawing Sheets

(56) References Cited

U.S. PATENT DOCUMENTS

| | | | | |
|---|---|---|---|---|
| 2014/0133179 A1* | 5/2014 | Franklin | .............. | G02B 6/0093 362/612 |
| 2014/0204310 A1* | 7/2014 | Lee | .................. | G02F 1/133308 349/62 |
| 2016/0131828 A1* | 5/2016 | Gotou | .................. | G02F 1/1333 348/790 |
| 2016/0131829 A1* | 5/2016 | Shin | ....................... | G02B 6/009 362/634 |
| 2016/0170258 A1* | 6/2016 | Maruno | ............ | G02F 1/133608 362/611 |
| 2016/0291245 A1* | 10/2016 | Franklin | .............. | G02B 6/0093 |

FOREIGN PATENT DOCUMENTS

| KR | 10-2013-0115417 | 10/2013 |
|---|---|---|
| KR | 10-2014-0026187 | 3/2014 |

* cited by examiner

DISPLAY DEVICE

CLAIM PRIORITY

This application makes reference to, incorporates the same herein, and claims all benefits accruing under 35 U.S.C. §119 from an application earlier filed in the Korean Intellectual Property Office on 18 Jul. 2014 and there duly assigned Serial No. 10-2014-0090797.

BACKGROUND

1. Field

Embodiments of the inventive concept generally relate to a display device capable of reducing (or preventing) damage to a display panel and an optical sheet.

2. Description of Related Technology

Circuits, conductive lines, and pad units are formed at two edge portions of four edge portions of a display panel. Therefore, the two edge portions where the components are formed have a large width, whereas the other two edge portions have a very small width.

The four edge portions of a display panel are placed on a seating portion of a mold frame. In this case, the seating portion on which the two edge portions having a large width are placed has a large area, whereas the seating portion on which the other two edge portions having a small width are placed has a very small area. Accordingly, in a process of coupling the display panel to the mold frame, the other two edge portions of the display panel fail to be stably placed on the seating portion and falls from the mold frame. Then, the edge portion of the display panel comes into collision with a base portion of a bottom chassis disposed between the mold frame and a light guide plate, which results in damage. Further, when the edge portion of the display panel falls from the mold frame, it pushes down an edge portion of an optical sheet that is located under the display panel. In this case, the edge portion of the optical sheet is broken by a corner portion of the light guide plate disposed under the optical sheet such that the optical sheet can be damaged.

It is to be understood that this background of this related technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY OF THE INVENTION

Aspects of embodiments of the inventive concept are directed toward a display device capable of reducing or prevent damage to a display panel and an optical sheet.

According to an embodiment of the inventive concept, a display device includes a bottom chassis including a base portion and one or more side portions extending at a predetermined angle from the base portion, a light guide plate on an upper surface of the bottom chassis, an optical sheet on the light guide plate, and a display panel on the optical sheet. At least one of the side portions may have a different width from the other side portions.

At least one end portion of the display panel may overlap a side portion having a large width among the side portions.

At least one of the side portions may have a different height from the other side portions.

The display device may further include a mold frame on at least one of the base portion and side portions of the bottom chassis.

The light guide plate may include a light guide plate body, a connection part extending from at least one side of the light guide plate body and including a bottom surface having a predetermined slope in a horizontal direction of the light guide plate body, and a seating part extending from one end portion of the connection part and having a smaller thickness than the light guide plate body. The seating part of the light guide plate may be disposed between the side portion of the bottom chassis and the mold frame.

The light guide plate may include a light guide plate body, a connection part extending from at least one side of the light guide plate body and including a bottom surface having a predetermined slope in a horizontal direction of the light guide plate body, and a seating part extending from one end portion of the connection part and having a smaller thickness than the light guide plate body.

The display device may further include a reflective sheet on at least one of the bottom surface of the connection part and a bottom surface of the seating part.

The seating part of the light guide plate may be disposed on the side portion of the bottom chassis.

A boundary line between the light guide plate body and the connection part makes an angle of about 40 degrees to about 50 degrees with a boundary line between an active area and non-active area of the display panel.

The display device may further include a first adhesive member including a region between the mold frame and the seating part.

The first adhesive member may be disposed between the display panel and the bottom chassis.

The first adhesive member on the mold frame may have a different thickness from the first adhesive member on the display panel.

The display device may further include a side cover configured to cover at least part of an upper surface of the display panel and at least part of the mold frame.

At least one of the side portions of the bottom chassis may not cover a side surface of the mold frame.

The display device may further include a second adhesive member between the mold frame and the side portion.

According to embodiments of the inventive concept, a display device can bring about the following effects.

First, at least one side portion has a different width from the other side portions. For example, the at least one side portion has a large width among the side portions. Therefore, even though edge portions of the display panel fail to be stably placed on the seating portion, the edge portions of the display panel can be placed on the at least one side portion. Accordingly, damage applied to the display panel is reduced and the display panel.

Second, a connection part extending from one side of a light guide plate and a seating part may be placed between a mold frame and the light guide plate so that a display panel may be prevented from falling down, thereby reducing damage to a display panel.

Third, an edge portion of a display panel may be fixed to a light guide plate or a side portion of a bottom chassis by an adhesive member, thereby reducing movement and falling of the display panel.

Fourth, a side portion of a bottom chassis may have a bent shape, thereby increasing hardness of the bottom chassis.

The foregoing summary is illustrative only and is not intended to be in any way limiting the claims of the inventive concept. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Advantages and features of the inventive concepts and methods for achieving them will be made clear from embodiments described below in detail with reference to the accompanying drawings. The inventive concepts may, however, be embodied in many different forms and should not be construed as being limited to the embodiments set forth herein. Rather, these embodiments are provided so that this disclosure will be thorough and complete, and will fully convey the scope of the invention to those skilled in the art. The inventive concepts is merely defined by the scope of the claims. Therefore, well-known constituent elements, operations and techniques are not described in detail in the embodiments in order to prevent the inventive concepts from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

In the specification, when a first element is referred to as being "connected" to a second element, the first element may be directly connected to the second element or indirectly connected to the second element with one or more intervening elements interposed therebetween. The terms "comprises," "comprising," "includes," and/or "including," when used in this specification, may specify the presence of stated features, integers, steps, operations, elements, and/or components, but do not preclude the presence or addition of one or more other features, integers, steps, operations, elements, and/or components.

Although the terms "first," "second," and "third" and the like may be used herein to describe various elements, these elements should not be limited by these terms. These terms may be used to distinguish one element from another element. Thus, "a first element" could be termed "a second element" or "a third element," and "a second element" and "a third element" can be termed likewise without departing from the teachings herein. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a backlight unit according to an embodiment of the inventive concept will be described in detail with reference to FIGS. 1 to 6. The names of elements used in the description hereinafter may be selected in consideration of easiness of description of a specification and may be different from the names of the components of the actual product.

Figure 1:
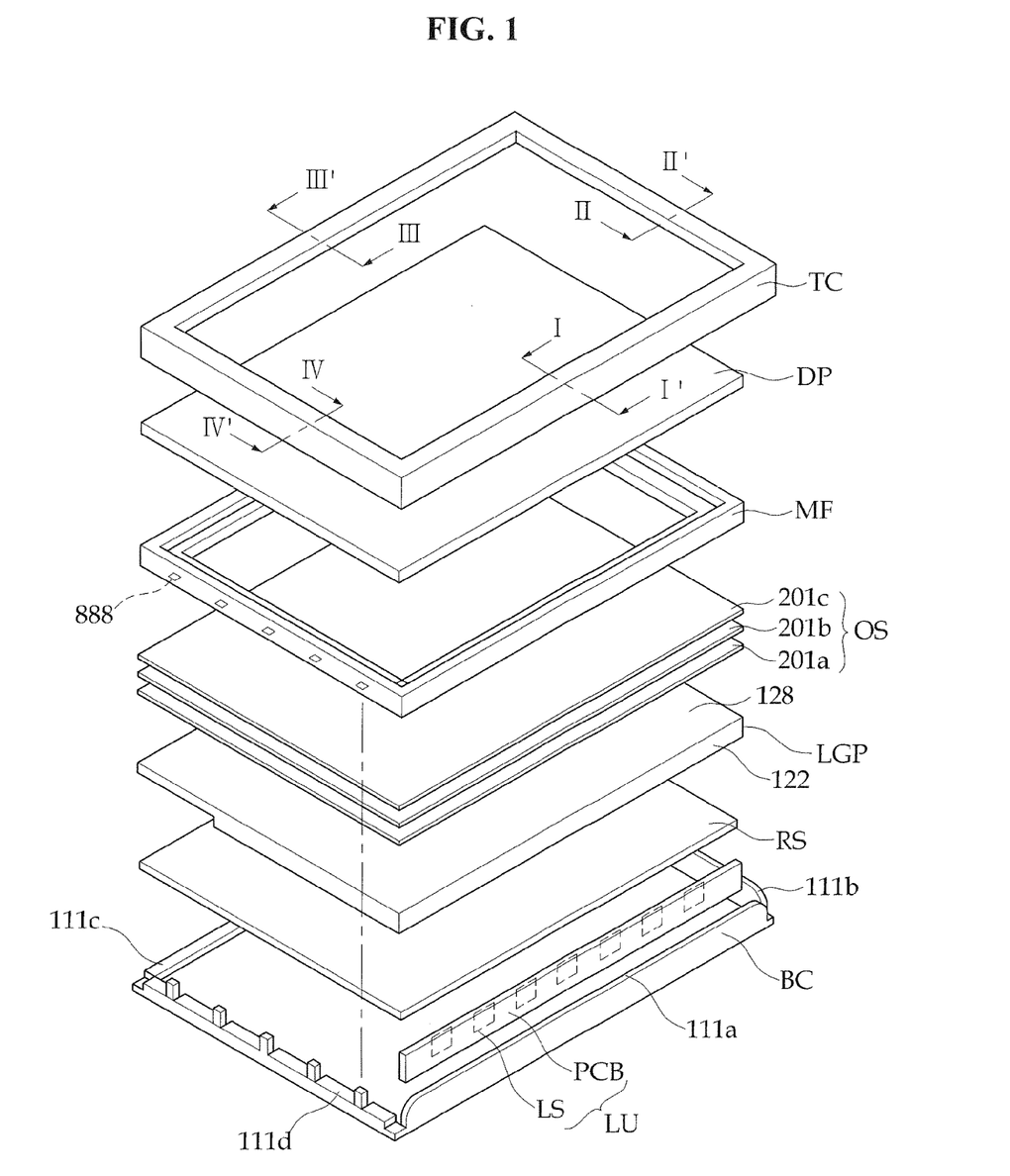
FIG. 1 is an exploded perspective view of a display device including a backlight unit according to an embodiment of the inventive concept.
Figure 2:
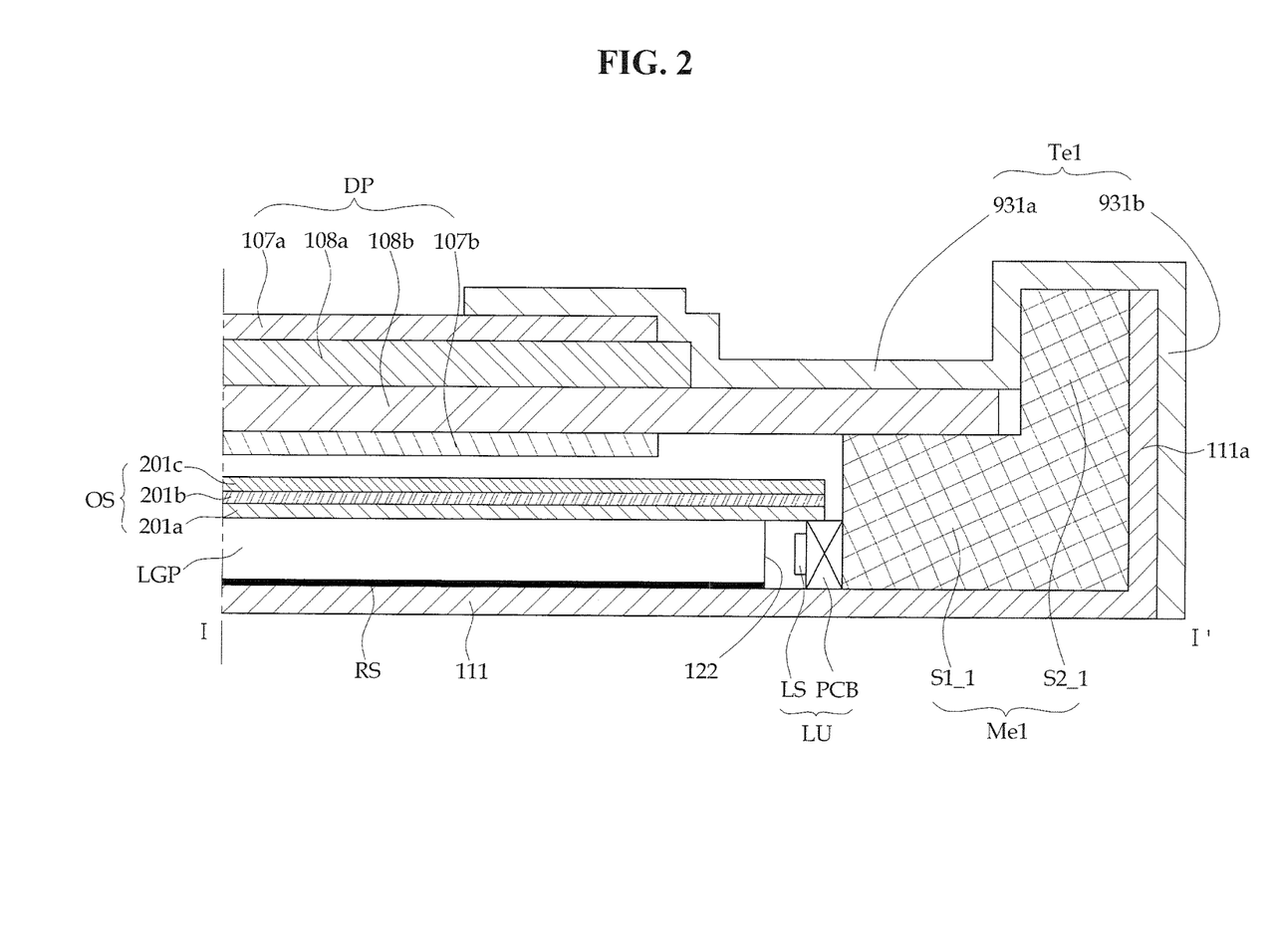
FIG. 2 is a cross-sectional view taken along line I-I' of FIG. 1.
Figure 3:
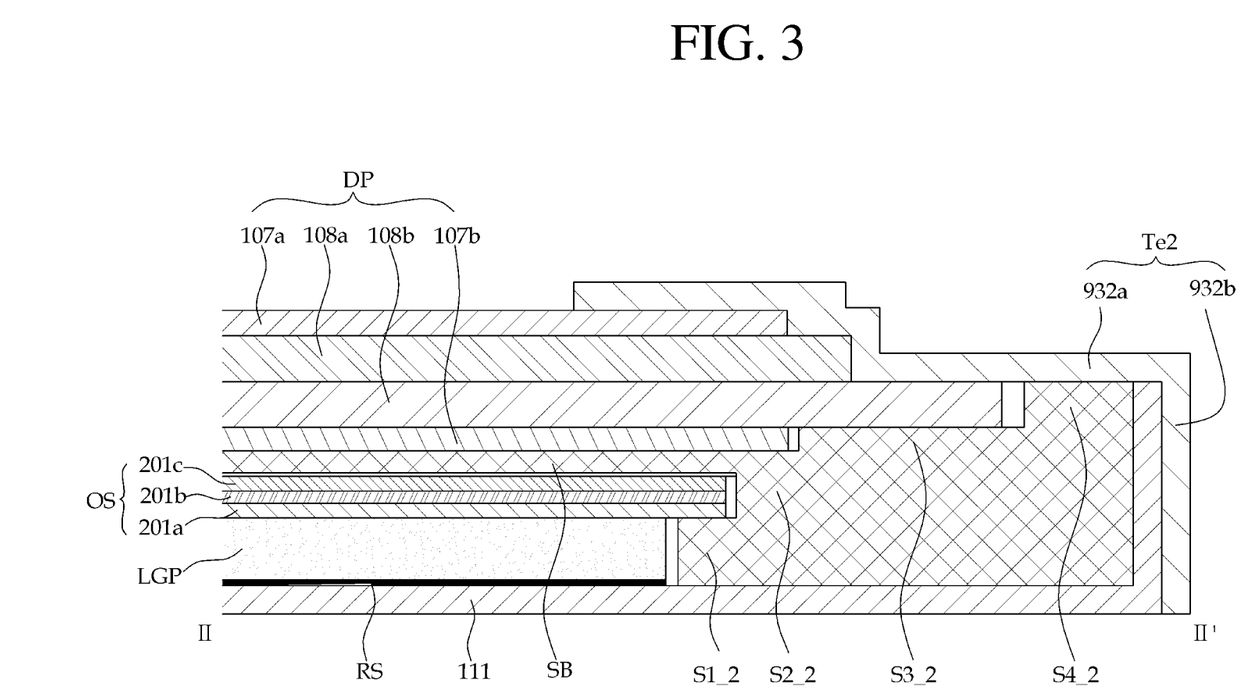
FIG. 3 is a cross-sectional view taken along line II-II' of FIG. 1.
Figure 4:
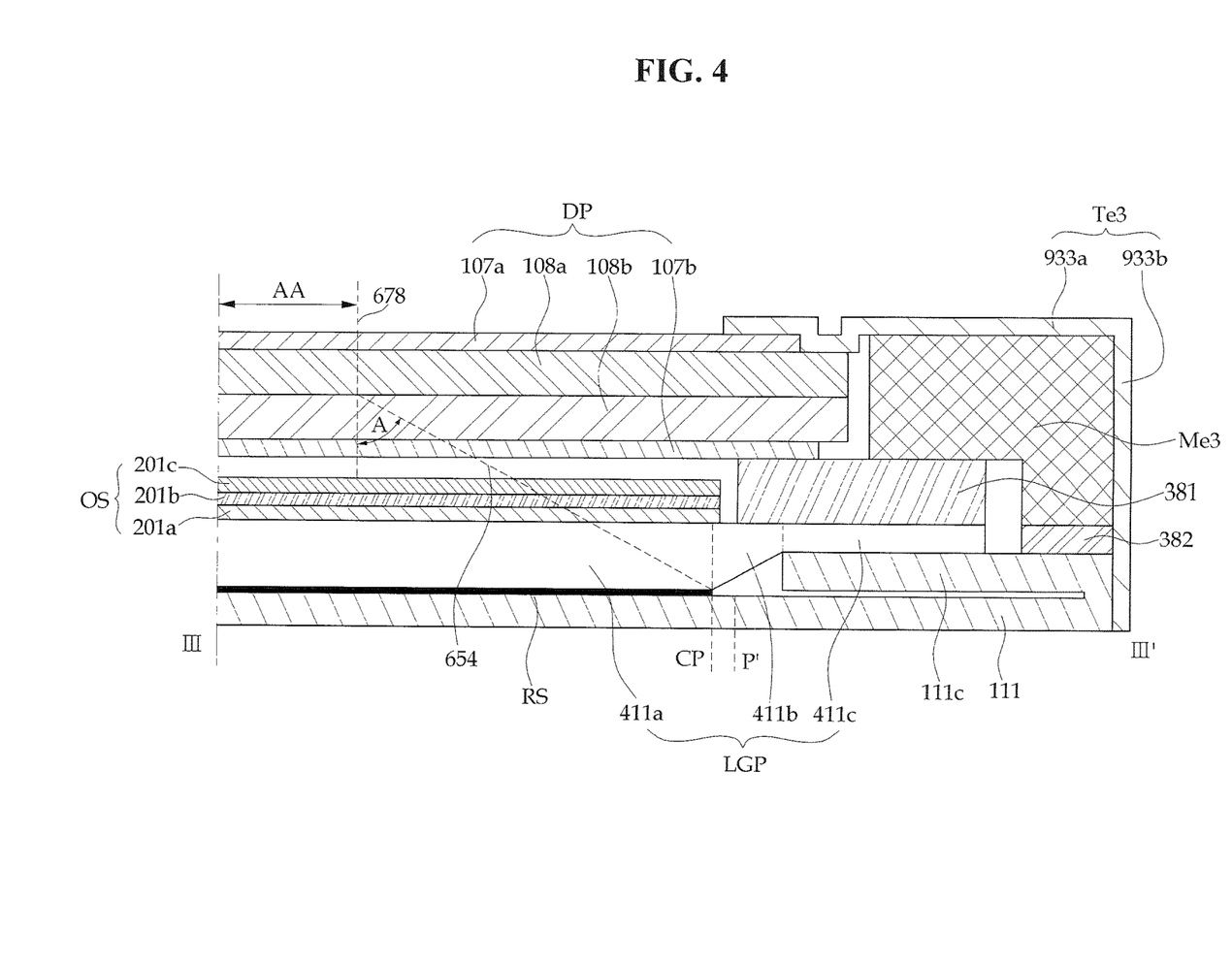
FIG. 4 is a cross-sectional view taken along line III-III' of FIG. 1.
Figure 5:
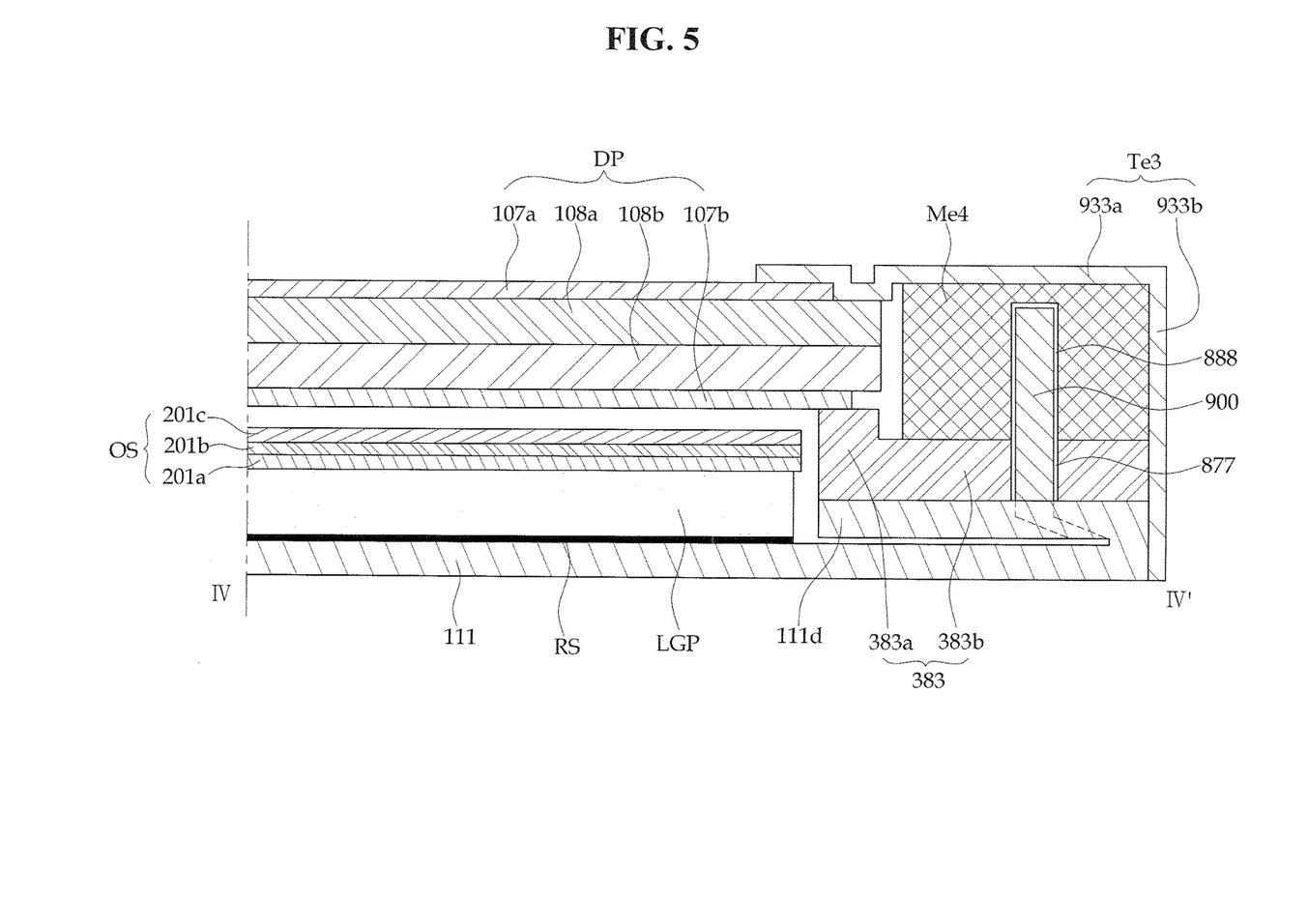
FIG. 5 is a cross-sectional view taken along line IV-IV' of FIG. 1.

FIG. 1 is an exploded perspective view of a display device including a backlight unit according to an embodiment of the inventive concept. FIG. 2 is a cross-sectional view taken along line I-I' of FIG. 1. FIG. 3 is a cross-sectional view taken along line II-II' of FIG. 1. FIG. 4 is a cross-sectional view taken along line III-III' of FIG. 1. FIG. 5 is a cross-sectional view taken along line IV-IV' of FIG. 1.

As illustrated in FIG. 1, a display device according to one embodiment includes a bottom chassis BC, a reflective sheet RS, a light guide plate LGP, an optical sheet OS, a light source unit LU, a mold frame MF, a display panel DP, and a top chassis TC. Herein, the reflective sheet RS, the light guide plate LGP, the optical sheet OS, the light source unit LU, and the mold frame MF may be included in a backlight unit according to one embodiment. The display panel DP and the backlight unit may be assembled into a laminated structure and may be included in a display module. The display module may further include a top chassis TC and a bottom chassis BC, which are configured to protect and fix the display panel DP and the backlight unit, and a driver circuit board configured to allow the display panel DP to drive.

The display panel DP may display an image. The display panel DP may be partitioned broadly into two portions: a display portion and a non-display portion. An image may be displayed in the display portion and signal lines may be disposed in the non-display portion so as to transmit image data, control signals, and power signals, which are required for the image display. All or part of driver circuits may be further disposed in the non-display portion or the driver circuit board so as to supply the image data, control signals, and power signals. The display panel DP, as illustrated in FIG. 2, may include a lower substrate 108a, an upper substrate 108a facing the lower substrate 108b, a lower polarizer 107b attached to a rear surface of the lower substrate 108b, and an upper polarizer 107a attached to an upper surface of the upper substrate 108a.

According to one embodiment, the display panel DP may be a liquid crystal display (LCD) panel. In this case, the lower substrate 108b may include a plurality of gate lines (not shown), a plurality of data lines (not shown) intersecting (or crossing) the plurality of gate lines, pixel electrodes (not shown) formed in each pixel area defined by the plurality of gate lines and the plurality of data lines, thin film transistors (TFTs) (not shown) driven by gate signals from the gate lines and supplying data signals from the data lines to the pixel electrodes. The upper substrate 108a may include a plurality of color filter layers disposed corresponding to each pixel area. Further, a liquid crystal layer may be disposed between the upper and lower substrates 108a and 108b.

However, the display panel DP according to embodiments of the inventive concept is not limited to the LCD panel. In addition to the LCD panel, any panel structure is available if it is capable of displaying an image, such as an organic light emitting diode display panel.

As illustrated in FIG. 1, the bottom chassis BC may include an accommodating space. The accommodating space may include a reflective sheet RS, a light guide plate LGP, an optical sheet OS, and a light source unit LU. In order to secure the accommodating space, the bottom chassis BC may include a base portion 111 having, for example, a quadrangular shape and first to fourth side portions 111a, 111b, 111c, and 111d protruding from edge portions of the base portion 111. A space defined by being surrounded by the side portions 111a, 111b, 111c, and 111d and the base portion 111 may be the accommodating space.

As illustrated in FIGS. 1 and 2, the first side portion 111a may protrude from the base portion 111 towards one edge portion of the top chassis TC. The angle between the first side portion 111a and the base portion 111 may be about 90 degrees.

As illustrated in FIGS. 1 and 3, the second side portion 111b may protrude from the base portion 111 towards another edge portion of the top chassis TC. The angle between the second side portion 111b and the base portion 111 may be about 90 degrees.

As illustrated in FIGS. 1 and 4, the third side portion 111c may have a bent shape. In one embodiment, the third side portion 111c may be bent toward the inside of the bottom chassis BC such that an interior surface of the third side portion 111c may face the base portion 111 and an exterior surface thereof may face a third edge portion of the display panel DP. The interior surface of the third side portion 111c, which may be bent, may be kept in a state of being in contact with the base portion 111. The angle between the third side portion 111c, which may be bent, and the base portion 111 may be zero (0) degrees.

As illustrated in FIGS. 1 and 5, the fourth side portion 111d may also have a bent shape. In one embodiment, the fourth side portion 111d may be bent toward the inside of the bottom chassis BC such that an interior surface of the fourth side portion 111d may face the base portion 111 and an exterior surface thereof may face a fourth edge portion of the display panel DP. The interior surface of the fourth side portion 111d, which may be bent, may be kept in a state of being in contact with the base portion 111. The angle between the fourth side portion 111d, which may be bent, and the base portion 111 may be zero (0) degrees. Further, the fourth side portion 111d may also have at least one securing protrusion 900. The securing protrusion 900 may protrude from the exterior surface of the fourth side portion 111d towards the mold frame MF.

At least one of the side portions 111a to 111d may have a different width from the other side portions. In one embodiment, the third and fourth side portions 111c and 111d may be bent, and may thus have a larger width than the first and second side portions 111a and 111b.

At least one of the side portions 111a to 111d may have a different height from the other side portions. In one embodiment, the third and fourth side portions 111c and 111d may be bent, and may thus be lower than the first and second side portions 111a and 111b.

At least one edge portion of the display panel DP may overlap a side portion having a large width among the side portions 111a to 111d.

The mold frame MF, as illustrated in FIGS. 1 to 5, may support the display panel DP and the top chassis TC and may maintain a given distance between the display panel DP and the optical sheet OS. The mold frame MF may be disposed on at least one of the base portion 111 and side portions 111a to 111d of the bottom chassis BC.

As illustrated in FIGS. 1 and 2, a first edge portion Me1 of the mold frame MF may be disposed on the base portion 111 between the light guide plate LGP and the first side portion 111a. The first edge portion Me1 of the mold frame MF may include first and second supports S1_1 and S2_1 that are different from each other in height.

The first support S1_1 with a small height may be closer to the light guide plate LGP than the second support S2_1 with a large height.

The first support S1_1 may support a first edge portion of the display panel DP. Thus, the first edge portion of the display panel DP may be disposed on the first support S1_1. As illustrated in FIG. 2, the first edge portion of the display panel DP may be an edge portion of the lower substrate 108b.

The second support S2_1 may support a first edge portion Te1 of the top chassis TC. Thus, the first edge portion Te1 of the top chassis TC may be disposed on the second support S2_1. In detail, the first edge portion Te1 of the top chassis TC may include an upper cover 931a and a side cover 931b, and part of the upper cover 931a may be disposed on the second support S2_1. As illustrated in FIG. 2, the upper cover 931a may cover the second support S2_1 disposed between the second support S2_1 and an edge portion of the upper polarizer 107a, and parts of the lower substrate 108b, upper substrate 108a, and upper polarizer 107a. The side cover 931b may cover an exterior surface of the first side portion 111a.

The second support S2_1 may limit movement of the first edge portion of the display panel DP so that the first edge portion of the display panel DP may be stably disposed on the second support S2_1.

As illustrated in FIGS. 1 and 3, a second edge portion Me2 of the mold frame MF may be disposed on the base portion 111 between the light guide plate LGP and the second side portion 111b. The second edge portion Me2 of the mold frame MF may include first to fourth supports S1_2, S2_2, S3_2, and S4_2, which are different in height, and a support bar SB extending from an inside surface of the second support S2_2 and disposed between a second edge portion of the display panel DP and an edge portion of the optical sheet OS.

The first support S1_2 may support the optical sheet OS. Thus, an edge portion of the optical sheet OS may be disposed on the first support S1_2.

The second support S2_2, the support bar SB, and the third support S3_2 may support the second edge portion of the display panel DP. Thus, the second edge portion of the display panel DP may be disposed on the second support S2_2, the support bar SB, and the third support S3_2. As illustrated in FIG. 3, an edge portion of the lower polarizer 107b, which is part of the second edge portion of the display panel DP, may be disposed on the second support S2_2 and the support bar SB, and an edge portion of the lower substrate 108b, which is another part of the second edge portion of the display panel DP, may be disposed on a third support bar SB.

The third support S3_2 may support a second edge portion Te2 of the top chassis TC. Thus, the second edge portion Te2 of the top chassis TC may be disposed on the third support S3_2. In detail, the second edge portion Te2 of the top chassis TC may include an upper cover 932a and a side cover 932b, and part of the upper cover 932a may be disposed on the third support S3_2. As illustrated in FIG. 3, the upper cover 932a may further cover the second cover S2_2 disposed between the third support S3_2 and an edge portion of the upper polarizer 107a, and parts of the lower substrate 108b, upper substrate 108a, and upper polarizer 107a. The side cover 932b may cover an outside surface of the second side portion 111b.

As illustrated in FIGS. 1 and 4, a third edge portion Me3 of the mold frame MF may be disposed on the third side portion 111c. That is, the third edge portion Me3 of the mold frame MF may be disposed on an exterior surface so as to face the exterior surface of the third side portion 111c that may be bent.

As illustrated in FIGS. 1 and 5, a fourth edge portion Me4 of the mold frame MF may be disposed on the fourth side portion 111d. In other words, the fourth edge portion Me4 of the mold frame MF may be disposed on an outside surface of the fourth side portion 111d, which may be bent, so as to face the outside surface thereof.

The light source unit LU illustrated in FIGS. 1 and 2 is an element configured to produce light, and may be accommodated in the bottom chassis BC so as to face a light incident surface of the light guide plate LGP. As illustrated in FIG. 2, the light source unit LU may be attached to the first support S1_1 provided at the first edge portion Me1 of the mold frame MF. In detail, the light source unit LU may be installed on a side surface of the first support S1_1.

Meanwhile, more than one light source unit LU may be provided based upon the size and luminance uniformity of the display panel DP. That is, other light source units corresponding to other side portions of the light guide plate LGP may be further installed at other edge portions of the mold frame MF.

The light source unit LU, as illustrated in FIGS. 1 and 2, may include a printed circuit board (PCB) and at least one light source LS.

Although not illustrated, one surface of the PCB may be partitioned into at least one mounting area and a conductive line area. In the case of two or more light sources, one light source LS may be mounted in each mounting area, and a plurality of conductive lines may be disposed in the conductive line area so as to transmit drive power to the light sources. The drive power may be generated by an external power supply unit (not shown) and may be supplied to the plurality of conductive lines through a separate connector (not shown). The PCB may be made of a metal material so that heat produced by the light source LS may be easily emitted outwards.

Although not illustrated, an adhesive member may be disposed between the other surface of the PCB and the first support S1_1. The light source unit LU may be bonded to the first support S1_1 by the adhesive member. The adhesive member may be a double-sided tape and one adhesive surface of the double-sided tape may be bonded to the PCB such that the light source unit LU may be formed.

The light source LS may be driven by drive power so that light may be emitted outwards. The light source LS may be installed on the PCB. The light source LS may be an emissive package including at least one light emitting diode (LED). In one embodiment, one emissive package may include a red LED emitting red light, a green LED emitting green light, and a blue LED emitting blue light. The emissive package may produce white light by combining three kinds of colors. In another embodiment, the emissive package may include only the blue LED among the LEDs of the above-described three colors, and in this case a phosphor may be disposed in an emissive part of the blue LED so as to convert blue light to white light. Light emitted from the light source LS may be incident on the light guide plate LGP.

The light guide plate LGP may guide light produced by the light source LS to the display panel DP. The light guide plate LGP may supply the light received from the light source LS equally to the entire surface of the display portion of the display panel DP. The light guide plate LGP may have a shape of polyhedron. Among a plurality of surfaces of the light guide plate LGP, one surface facing the light source LS is defined as a light incident surface 122 and among the plurality of surfaces of the light guide plate LGP, one surface directed towards the display panel DP is defined as a light emitting surface 128. Light emitted from the light source LS may be incident on the light incident surface 122 of the light guide plate LGP. The incident light may propagate inside the light guide plate LGP. The light guide plate LGP may allow the light propagating inside the light guide plate LGP to be totally internally reflected so as to be emitted outwards through the light emitting surface 128. The light emitted outwards through the light emitting surface 128 may be transmitted through the optical sheet OS and may be provided towards the display portion of the display panel DP. Meanwhile, although not illustrated, a plurality of scattering patterns may be further disposed on a lower outside surface of the light guide plate LGP so as to increase reflectivity of the light guide plate LGP. The distance between the scattering patterns may become larger as the scattering patterns are disposed farther from the light incident surface 122 of the light guide plate LGP. Herein, the lower outside surface of the light guide plate LGP may refers to a surface that faces the base portion 111, among the surfaces of the light guide plate LGP.

The light guide plate LGP may be made of a light-transmissive material, e.g., an acrylic resin such as polymethylmethacrylate (PMMA) or polycarbonate (PC), so as to guide light efficiently.

The reflective sheet RS may be disposed between the light guide plate LGP and the base portion 111. The reflective sheet RS may reflect light passing through the lower outside surface of the light guide plate LGP and emitted outwards back into the light guide plate LGP, thereby reducing (or minimizing) light loss. The reflective sheet RS may be made of, for example, polyethylene terephthalate (PET) which imparts reflective properties, and one surface of the reflective sheet RS may be coated with a diffusion layer containing, for example, titanium dioxide. The reflective sheet RS may also be made of a material containing a metal such as silver (Ag).

The optical sheet OS may serve to diffuse and collimate light transmitted from the light guide plate LGP and may be disposed between the light guide plate LGP and the display panel DP. The optical sheet OS may include a diffusion sheet 201a, a prism sheet 201b, and a protective sheet 201c. The diffusion sheet 201a, prism sheet 201b, and protective sheet 201c may be sequentially laminated on the light guide plate LGP in the order in which they are enumerated.

The diffusion sheet 201a may diffuse light received from the light guide plate LGP so as to prevent the light from being partially concentrated.

The prism sheet 201b may be disposed on the diffusion sheet 201a and may collimate light diffused by the diffusion sheet 201a in a direction perpendicular to the display panel DP. To this end, the prism sheet 201b may have triangular prisms on one surface thereof in a predetermined arrangement.

The protective sheet 201c may be disposed on the prism sheet 201b so as to protect a surface of the prism sheet 201b and diffuse light to obtain uniformly distributed light. Light passing through the protective sheet 201c may be provided to the display panel DP.

Detailed configuration of the light guide plate LGP will be described below with reference to FIGS. 1 and 4.

The light guide plate LGP, as illustrated in FIGS. 1 and 4, may include a light guide plate body 411a, a connection part 411b, and a seating part 411c.

The light guide plate body 411a may be shaped like a hexahedron (e.g., rectangular parallelepiped). Among surfaces included in the light guide plate body 411a, a surface facing the light source unit LU may be defined as the light incident surface 122, and among the surfaces thereof, a surface facing the display panel DP may be defined as the light emitting surface 128.

The connection part 411b may extend from at least one side of the light guide plate body 411a. The connection part 411b may include a bottom surface having a predetermined slope in a horizontal direction of the light guide plate body 411a. In one embodiment, the connection part 411b may extend one surface disposed opposite to the light incident surface 122 and the bottom surface of the connection part 411b may be inclined at a predetermined angle with respect to the base portion 111.

The seating part 411c may extend from one end portion of the connection part 411b. The seating part 411c may have a shape of a hexahedron (e.g., rectangular parallelepiped). The seating part 411c may have a smaller thickness than the light guide plate body 411a.

The seating part 411c may be disposed on the third side portion 111c. Surfaces of the seating part 411c and third side portion 111c, which face each other, may be kept in a state of being in contact with each other.

In the meantime, the bottom surface of the connection part 411b may start to be inclined from a critical point CP. The bottom surface of the connection part 411b may start to be inclined from a place that may be outside at least more than the critical point CP. In one embodiment, the bottom surface may start to be inclined from P' shown in FIG. 4. When an imagined straight line 654 is drawn from the center of a boundary line 678 defining an interface between an active area AA and non-active area of the display panel DP so as to make an angle A of about 40 degrees to about 50 degrees with the boundary line 678, and it minimizes a distance towards the light guide plate LGP, the critical point CP refers to a point where the imagined straight line 654 meets a horizontal bottom surface of the light guide plate body 411a. The center of the boundary line 678 may be an intersection point of the boundary line 678 and the vertical center of the display panel DP. The vertical center of the display panel DP may be a point that may be located at a position of ½ of the width of the display panel DP including the lower substrate 108b, the upper substrate 108a, the lower polarizer 107b, and the upper polarizer 107a. Herein, the angle A may be about 45 degrees.

Meanwhile, the active area AA of the display portion refers to an area where an image is actually displayed, and if the display panel DP according to an embodiment may be an LCD panel, the boundary line 678 may be located at an interface between the active area AA and a liquid crystal margin area.

In the meantime, a boundary line between the light guide plate body 411a and the connection part 411b may make an angle of about 40 degrees to about 50 degrees with a boundary line between the active area AA and non-active area of the display panel DP.

Figure 6:
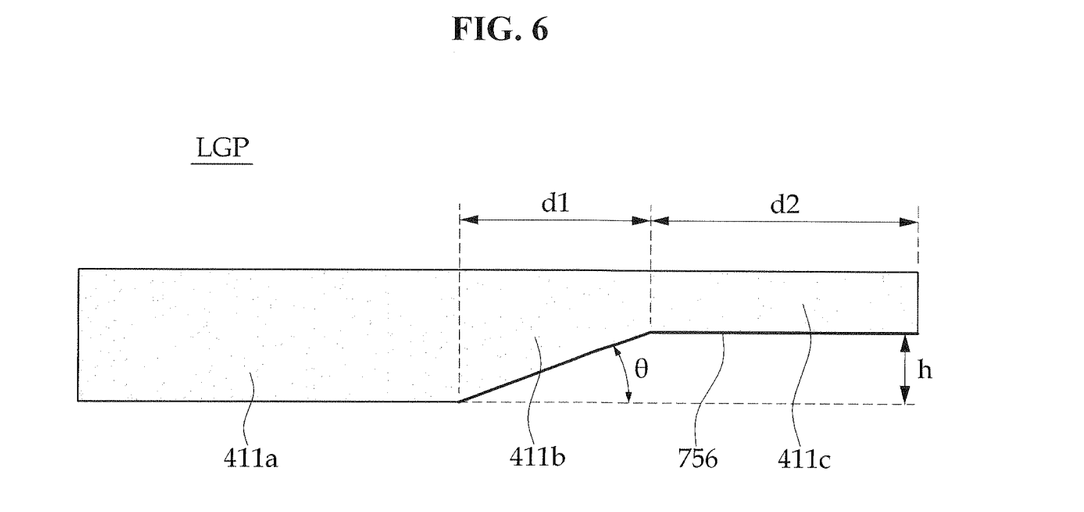
FIG. 6 is an enlarged view of a light guide plate (LGP) illustrated in FIG. 4.

FIG. 6 is an enlarged view of a light guide plate (LGP) illustrated in FIG. 4.

As illustrated in FIG. 6, a distance d1 of the connection part 411b may be minimized to decrease light reflectivity in the connection part 411b. In this case, an angle between the bottom surface of the connection part 411b and the base portion 111 may approach about 90 degrees. A distance d2 of the seating part 411c may be suitably adjusted according to the distance between an end portion of the seating part 411c and the mold frame MF. A height h from the base portion 111 to a bottom surface of the seating part 411c, which faces the base portion 111, may also be suitably adjusted according to the thickness of the third side portion 111c.

Meanwhile, as illustrated in FIG. 6, a reflective member 756 may be further attached to at least one of the bottom surfaces of the connection part 411b and seating part 411c, that is the same as the reflective sheet RS may be used as the reflective member 756.

A first adhesive member 381, as illustrated in FIG. 4, may be disposed on the connection part 411b and seating part 411c. Part of the first adhesive member 381 may be disposed between the connection part 411b and the third edge portion of the display panel DP, and another part of the first adhesive member 381 may be disposed between the seating part 411c and the third edge portion Me3 of the mold frame MF. The display panel DP, the mold frame MF, and the light guide plate LGP may be bonded to each other by the first adhesive member 381. Thus, part of the first adhesive member 381 may be in contact with the lower polarizer 107b included in the display panel DP, another part of the first adhesive member 381 may be in contact with the third edge portion Me3 of the mold frame MF, and yet another part of the first adhesive member 381 may be in contact with the connection part 411b and seating part 411c of the light guide plate LGP.

The first adhesive member 381 may maintain a distance between the display panel DP and the light guide plate LGP. The optical sheet OS may be disposed in a space between the first adhesive member 381 and the light guide plate LGP. Further, the first adhesive member 381 may act as a cushion between the display panel DP and the light guide plate LGP, and between the mold frame MF and the light guide plate LGP.

A second adhesive member 382, as illustrated in FIG. 4, may be disposed between the third side portion 111c and the third edge portion Me3 of the mold frame MF. The third side portion 111c and the mold frame MF may be bonded to each other by the second adhesive member 382. Thus, part of the second adhesive member 382 may be in contact with the third side portion 111c, and another part of the second adhesive member 382 may be in contact with the third edge portion Me3 of the mold frame MF.

A double-sided adhesive foam tape having elasticity may be used as the first and second adhesive members 381 and 382.

The third edge portion Me3 of the mold frame MF may support the third edge portion Te3 of the top chassis TC. Thus, the third edge portion Te3 of the top chassis TC may be located on the third edge portion Me3 of the mold frame MF. In detail, the third edge portion Te3 of the top chassis TC may include an upper cover 933a and a side cover 933b and part of the upper cover 933a may be disposed on the third edge portion Me3 of the mold frame MF. As illustrated in FIG. 4, the upper cover 933a may further cover parts of the upper substrate 108a and upper polarizer 107a between the third edge portion Me3 of the mold frame MF and an edge portion of the upper polarizer 107a. The side cover 933b may cover the third edge portion Me3 of the mold frame MF, the second adhesive member 382, and the third side portion 111c, which are exposed outside the bottom chassis BC. In detail, the side cover 933b may cover an outside of the third edge portion Me3 of the mold frame MF, an outside of the second adhesive member 382, and an outside of the third side portion 111c.

The outside of the third edge portion Me3 of the mold frame MF, the outside of the second adhesive member 382, and end portions of the third side portion 111c, which may be bent, may be collinearly located with respect to each other.

A third adhesive member 383, as illustrated in FIG. 5, may be disposed on the fourth side portion 111d. The third adhesive member 383 may include two adhesive layers 383a and 383b that are different from each other in height. The first adhesive layer 383a may be disposed between the fourth side portion 111d and a fourth edge portion of the display panel DP, and the second adhesive layer 383b may be disposed between the fourth side portion 111d and the fourth edge portion Me4 of the mold frame MF. Herein, the first adhesive layer 383a may be higher than the second adhesive layer 383b. The display panel DP, the mold frame MF, and the fourth side portion 111d may be bonded to each other by the third adhesive member 383. Thus, part of the third adhesive member 383 may be in contact with the lower polarizer 107b included in the display panel DP, another part of the third adhesive member 383 may be in contact with the fourth edge portion Me4 of the mold frame MF, and yet another part of the third adhesive member 383 may be in contact with the fourth side portion 111d.

The third adhesive member 383 may maintain a distance between the display panel DP and the light guide plate LGP. The optical sheet OS may be disposed in a space between the third adhesive member 383 and the light guide plate LGP. Further, the third adhesive member 383 may act as a cushion between the display panel DP and the light guide plate LGP, and between the mold frame MF and the fourth side portion 111d.

A double-sided adhesive foam tape having elasticity may be used as the third adhesive member 383.

Meanwhile, a fixing hole 877 penetrating the third adhesive member 383 may be formed therein, and a fixing groove 888, which is visible through the fixing hole 877, may be formed in the fourth edge portion Me4 of the mold frame MF. The securing protrusion 900 protruding from the fourth side portion 111d may be fitted into the fixing groove 888 through the fixing hole 877. The fixing holes 877 of which the number may be the same as that of the securing protrusion 900 may be formed in the third adhesive member 383. Similarly, the fixing groove 888 of which the number is identical to that of the securing protrusion 900 may be formed in the mold frame MF.

The fourth edge portion Me4 of the mold frame MF may support the fourth edge portion Te4 of the top chassis TC. Thus, the fourth edge portion Te4 of the top chassis TC may be disposed on the fourth edge portion Me4 of the mold frame MF. In detail, the fourth edge portion Te4 of the top chassis TC may include an upper cover 934a and a side cover 934b and part of the upper cover 934a may be disposed on the fourth edge portion Me4 of the mold frame MF. As illustrated in FIG. 5, the upper cover 934a may further cover parts of the upper substrate 108a and upper polarizer 107a between the fourth edge portion Me4 of the mold frame MF and an edge portion of the upper polarizer 107a. The side cover 934b may cover the fourth edge portion Me4 of the mold frame MF, the third adhesive member 383, and the fourth side portion 111d, which are exposed outside the bottom chassis BC. In detail, the side cover 934b may cover an outside of the fourth edge portion Me4 of the mold frame MF, an outside of the third adhesive member 383, and an outside of the fourth side portion 111d.

The outside of the fourth edge portion Me4 of the mold frame MF, the outside of the third adhesive member 383, and end portions of the fourth side portion 111d, which may be bent, may be collinearly located with respect to each other.

The top chassis TC, as illustrated in FIGS. 1 to 5, may have a shape of a quadrilateral frame that covers only an edge portion (the non-display portion) of a front surface of the display panel DP. An adhesive tape or an adhesive film may be used As the top chassis TC.

Figure 7:
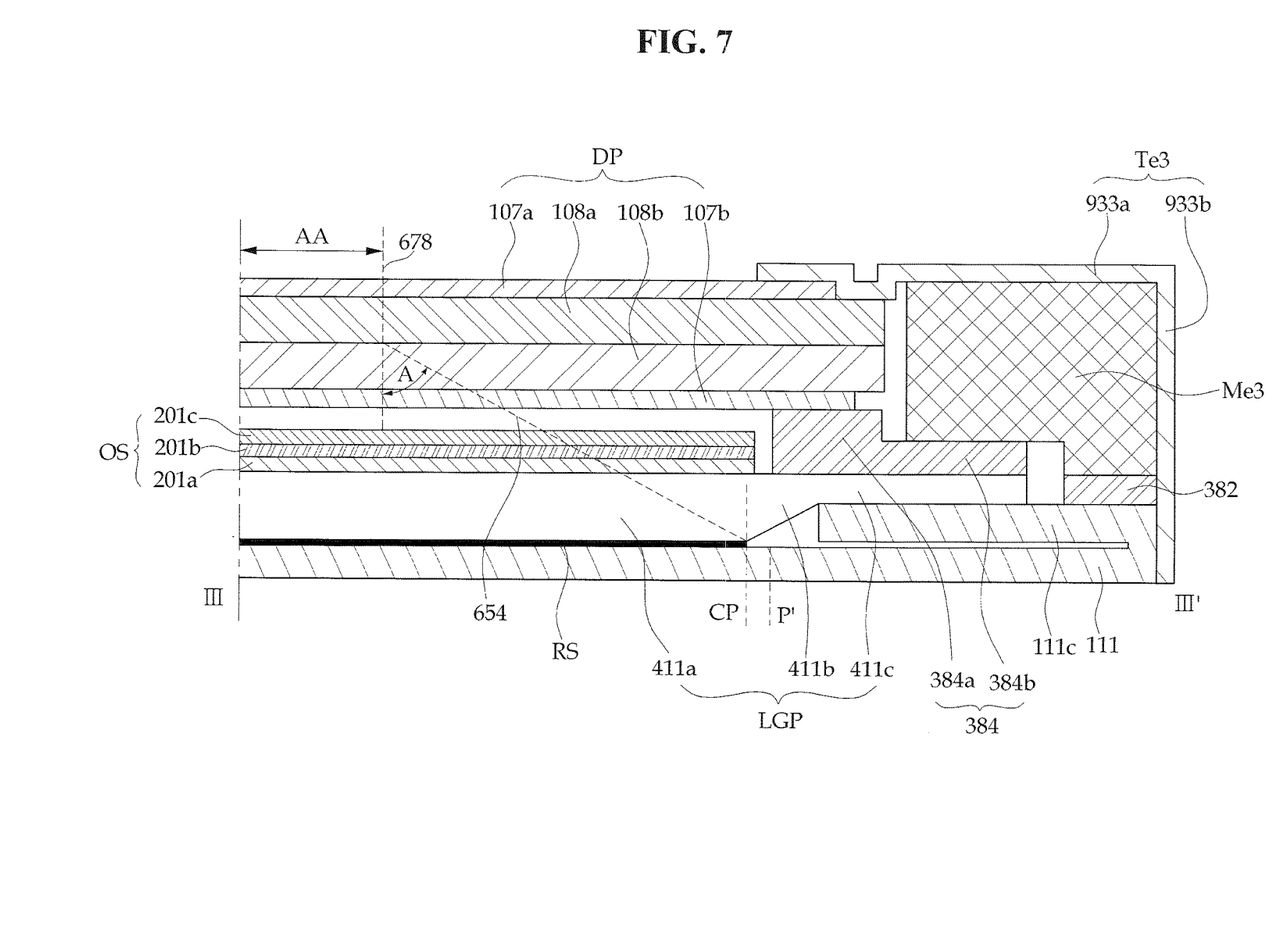
FIG. 7 is a cross-sectional view taken along line III-III' of FIG. 1, according to another embodiment of the inventive concept.

FIG. 7 is a cross-sectional view taken along line III-III' of FIG. 1, according to another embodiment of the inventive concept.

Configurations illustrated in FIG. 7 may be substantially consistent with those of FIG. 4. However, a first adhesive member 384 illustrated in FIG. 7 is different from the first adhesive member 381 of FIG. 4.

In other words, the first adhesive member 384 illustrated in FIG. 7 may include two adhesive layers 384a and 384b that are different from each other in height. The first adhesive layer 384a may be higher than the second adhesive layer 384b. The first adhesive layer 384a may be disposed between the connection part 411b and the third edge portion of the display panel DP, and between the seating part 411c and the third edge portion of the display panel DP. The second adhesive layer 384b may be disposed between the seating part 411c and the third edge portion Me3 of the mold frame MF.

The display panel DP, the mold frame MF, and the light guide plate LGP may be bonded to each other by the first adhesive member 384. Thus, part of the first adhesive member 384 may be in contact with the lower polarizer 107b included in the display panel DP, another part of the first adhesive member 384 may be in contact with the third edge portion Me3 of the mold frame MF, and yet another part of the first adhesive member 384 may be in contact with the connection part 411b and seating part 411c of the light guide plate LGP.

Descriptions of other configurations illustrated in FIG. 7 refer to the description with reference to FIG. 4.

Figure 8:
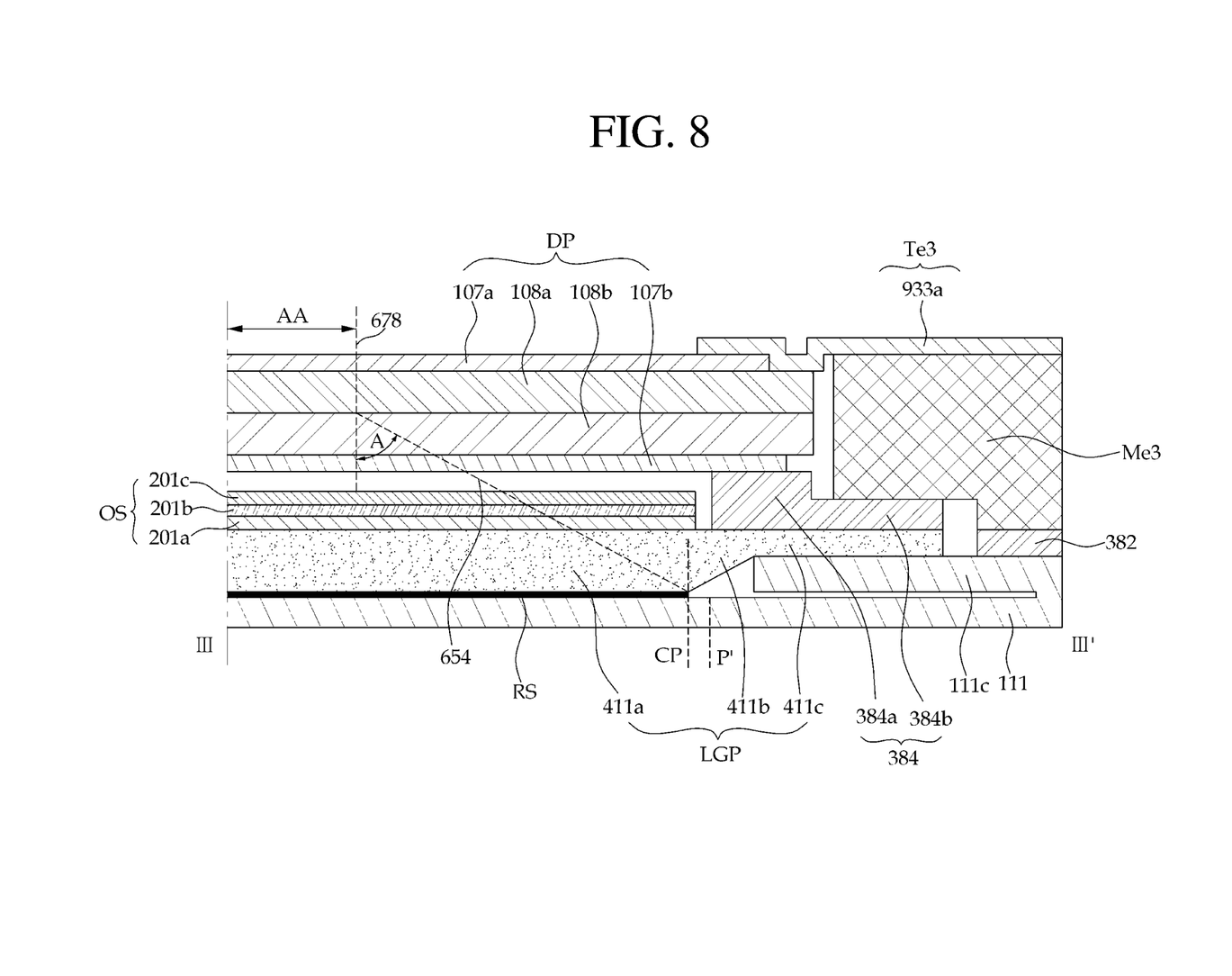
FIG. 8 is a cross-sectional view taken along line III-III' of FIG. 1, according to yet another embodiment of the inventive concept.

FIG. 8 is a cross-sectional view taken along line III-III' of FIG. 1, according to yet another embodiment of the inventive concept.

As illustrated in FIG. 8, among the components of the third edge portion Te3 of the top chassis TC, the side cover 933b may be omitted. In other words, the third edge portion Te3 of the top chassis TC may include only the upper cover 933a. In this case, an outside of the third edge portion Me3 of the mold frame MF, an outside of the second adhesive member 382, and an bent part of the third side portion 111c may be exposed outside a display device.

According to the configuration illustrated in FIG. 8, when the light guide plate LGP may expand by heat generated by the light sources LSs and an end portion of the seating part 411c thereof may push the second adhesive member 382 outwards, the second adhesive member 382 and the third edge portion Me3 of the mold frame MF may be easily pushed outwards. Therefore, it is possible to prevent the light guide plate LGP from being convexly bent at its central portion due to the thermal expansion.

Meanwhile, although not illustrated, the upper cover 933a illustrated in FIG. 8 may also be omitted (hereinafter, a changed configuration of FIG. 8). That is, the third edge portion Te3 may be completely removed from the top chassis TC.

Meanwhile, the configuration of FIG. 8 or its changed configuration may be selectively applied to an edge portion of the top chassis TC disposed opposite to the light incident surface 122 of the light guide plate LGP. This is because the light source LS may be disposed on the light incident surface 122 and more specifically, heat applied to the light incident surface 122 may expand the light guide plate LGP in a direction opposite to the light incident surface 122. Accordingly, when the light source unit LU and the light incident surface 122 of the light guide plate LGP are disposed towards the fourth side portion 111d, the configuration illustrated in FIG. 8 or its changed configuration may be applied to the second edge portion Te2 of the top chassis TC disposed towards the second side portion 111b.

In another embodiment, the top chassis TC itself may not be used.

From the foregoing, it will be appreciated that various embodiments of the inventive concept have been described herein for purposes of illustration, and that various modifications may be made without departing from the scope and spirit of the present disclosure. Accordingly, the various embodiments disclosed herein are not intended to limit the scope of the inventive concept, and the true scope and spirit of the inventive concept is indicated by the following claims, and equivalents thereof.

What is claimed is:

1. A display device, comprising:
   a bottom chassis comprising a base portion and a plurality of side portions of which at least one extends from a major surface of the base portion;
   a light guide plate on an upper surface of the bottom chassis;
   an optical sheet on the light guide plate; and
   a display panel on the optical sheet,
   wherein the at least one of the side portions makes an angle less than 90 degrees with the major surface of the base portion,
   wherein the at least one of the side portions and the base portion are unitary as a single structure,
   wherein the at least one of the side portions has a different width, measured in a direction parallel to the major surface of the base portion, from the other side portions;
   wherein a portion of the side portion is disposed between the base portion and the light guide plate.

2. The display device of claim 1, wherein at least one end portion of the display panel overlaps a side portion having a larger width than at least one of the remaining side portions.

3. The display device of claim 1, wherein at least one of the side portions has a different height from the other side portions.

4. The display device of claim 1, further comprising:
   a mold frame on at least one of the base portion and side portions of the bottom chassis.

5. The display device of claim 4, wherein the light guide plate comprises:
   a light guide plate body;
   a connection part extending from at least one side of the light guide plate body and comprising a bottom surface having a predetermined slope in a horizontal direction of the light guide plate body; and
   a seating part extending from one end portion of the connection part and having a smaller thickness than the light guide plate body,
   wherein the seating part of the light guide plate is disposed between the side portion of the bottom chassis and the mold frame.

6. The display device of claim 1, wherein the light guide plate comprises:
   a light guide plate body;
   a connection part extending from at least one side of the light guide plate body and comprising a bottom surface having a predetermined slope in a horizontal direction of the light guide plate body; and
   a seating part extending from one end portion of the connection part and having a smaller thickness than the light guide plate body.

7. The display device of claim 6, further comprising:
   a reflective sheet on at least one of the bottom surface of the connection part and a bottom surface of the seating part.

8. The display device of claim 6, wherein the seating part of the light guide plate is disposed on at least one of the side portions of the bottom chassis.

9. The display device of claim 6, wherein a boundary line between the light guide plate body and the connection part makes an angle of about 40 degrees to about 50 degrees with a boundary line between an active area and non-active area of the display panel.

10. The display device of claim 6, further comprising:
    a first adhesive member comprising a region between the mold frame and the seating part.

11. The display device of claim 10, wherein the first adhesive member is disposed between the display panel and the bottom chassis.

12. The display device of claim 11, wherein the first adhesive member closer to the mold frame has a different thickness from the first adhesive member closer to the display panel.

13. The display device of claim 4, further comprising:
    a side cover configured to cover at least part of an upper surface of the display panel and at least part of the mold frame.

14. The display device of claim 4, wherein at least one of the side portions of the bottom chassis does not cover a side surface of the mold frame.

15. The display device of claim 14, further comprising:
 a second adhesive member between the mold frame and at least one of the side portions.

16. The display device of claim 1, wherein the at least one of the side portions faces the base portion with a gap between the at least one of the side portion and the major surface of the base portion.

* * * * *